(12) United States Patent
Chopra et al.

(10) Patent No.: US 8,442,864 B2
(45) Date of Patent: May 14, 2013

(54) DIGITAL DEVICE ADVERTISING SYSTEM AND METHOD

(75) Inventors: Vinay Chopra, Thornhill (CA); Kanak K. Chopra, Thornhill (CA); Madhu Chopra, Thornhill (CA); Annu K. Chopra, Thornhill (CA)

(73) Assignee: Mobiroo Inc., Ontario (CA)

( * ) Notice: Subject to any disclaimer, the term of this patent is extended or adjusted under 35 U.S.C. 154(b) by 0 days.

(21) Appl. No.: 13/322,031

(22) PCT Filed: Aug. 13, 2010

(86) PCT No.: PCT/CA2010/001245
§ 371 (c)(1),
(2), (4) Date: Nov. 22, 2011

(87) PCT Pub. No.: WO2011/022808
PCT Pub. Date: Mar. 3, 2011

(65) Prior Publication Data
US 2012/0143697 A1 Jun. 7, 2012

Related U.S. Application Data

(60) Provisional application No. 61/237,004, filed on Aug. 26, 2009.

(51) Int. Cl.
*G06Q 30/00* (2012.01)
*G06F 3/00* (2006.01)
*G06F 9/45* (2006.01)

(52) U.S. Cl.
USPC ............... 705/14.64; 705/14.4; 705/14.66; 705/14.73; 705/14.1; 715/745; 717/174; 717/176; 717/177; 717/178

(58) Field of Classification Search ............. 705/14
See application file for complete search history.

(56) References Cited

U.S. PATENT DOCUMENTS

| | | | |
|---|---|---|---|
| 2001/0014868 A1* | 8/2001 | Herz et al. | 705/14 |
| 2002/0090985 A1* | 7/2002 | Tochner et al. | 463/1 |
| 2004/0186774 A1* | 9/2004 | Lee | 705/14 |
| 2005/0005242 A1* | 1/2005 | Hoyle | 715/745 |
| 2005/0038756 A1* | 2/2005 | Nagel | 705/76 |
| 2005/0273779 A1* | 12/2005 | Cheng et al. | 717/168 |
| 2005/0283444 A1 | 12/2005 | Ekberg | |

(Continued)

FOREIGN PATENT DOCUMENTS

WO WO-2008/040949 4/2008

*Primary Examiner* — John Weiss
*Assistant Examiner* — Vincent Cao
(74) *Attorney, Agent, or Firm* — Kagan Binder, PLLC

(57) ABSTRACT

A system and method for allowing users to download modified software applications for digital devices, such as mobile phones, computers, electronic devices and mobile devices capable of wireless communication by the provision by the user of an authentication code that is validated to determine that the user is permitted to download and use a modified software application for the digital device. The system authorizes the user to download and use a modified software application and provides advertisements, directly associated with the campaign's authentication code(s), to the modified software application as it runs on the digital device, where the modified software application has been modified to accept and display advertisements on the digital device. The invention further includes allocating credits to authentication codes and deducting credits based on a credit value assigned to each modified software application and/or digital product, such as a digital song. The invention further includes the capability to track the usage of such modified software applications based on the authentication codes.

22 Claims, 3 Drawing Sheets

U.S. PATENT DOCUMENTS

| | | |
|---|---|---|
| 2006/0165060 A1 | 7/2006 | Dua |
| 2006/0212401 A1* | 9/2006 | Ameerally et al. ............. 705/51 |
| 2006/0282308 A1* | 12/2006 | Cheng et al. .................... 705/14 |
| 2007/0143212 A1* | 6/2007 | Smith et al. ..................... 705/50 |
| 2007/0150744 A1* | 6/2007 | Cheng et al. ................... 713/185 |
| 2007/0162341 A1* | 7/2007 | McConnell et al. ............ 705/14 |
| 2007/0174490 A1 | 7/2007 | Choi et al. |
| 2009/0076899 A1 | 3/2009 | Gbodimowo |
| 2009/0197582 A1 | 8/2009 | Lewis et al. |
| 2009/0307070 A1* | 12/2009 | Logie ......................... 705/14.15 |

* cited by examiner

DIGITAL DEVICE ADVERTISING SYSTEM AND METHOD

RELATED APPLICATION

This application claims the benefit from International Application No. PCT/CA2010/001245, which was filed on Aug. 13, 2010, which in turn claims priority under 35 U.S.C. §119(e) to U.S. Provisional Application No. 61/237,004, filed Aug. 26, 2009, both of which are incorporated herein by reference in their entireties.

FIELD OF THE INVENTION

The present invention relates generally to systems and methods for delivering messages and advertisements to digital devices, and more particularly to systems and methods for delivering messages and advertisements to digital devices running modified software applications.

BACKGROUND OF THE INVENTION

Systems and methods have been disclosed to insert advertisements into software applications ("apps") designed to run on digital devices such as mobile phones, smartphones, personal computers and laptop computers. These approaches involve modifying an existing app, or creating a new app, so that the app will display advertisements on the display screen of the digital device. Such advertisements are typically displayed immediately after an app is run on a digital device or in a portion of the digital device's display screen while the app is running on the digital device.

Such advertisements may be embedded in the app and may be served from a remote server. Such apps are provided to end users free of charge, whereby the application publishers are compensated by the advertisers. Where the app is designed to run on a mobile device, displaying an advertisement while the application is running typically involves reserving a small portion of the app's display on the mobile device for the advertisements and/or within the load-up screen of the app.

In some cases a user may be able to click on an advertisement and thereby be provided with more extensive advertising content, typically provided directly by a server operated by the advertiser.

The advertisements displayed to users by such apps are typically delivered in a non-discriminatory fashion to each user of a modified app. Some approaches to better targeting advertisements to particular users have been devised based on information that the modified app obtains from the user or from the user's device. Such approaches are limited by the availability of such information and the user's willingness to provide it. When requested to provide information, users may refuse or enter false information.

Such apps often include provision for tracking effectiveness of the advertisements by tracking the number of times users click on advertisements or by tracking the number of times an advertisement is presented to users. The usefulness of such information is limited by the limited information available about the users.

Such apps are typically distributed only in such form at no cost to the user, and may be inferior in functionality and quality to apps that users pay to download and use. Users are generally not willing to view advertisements in apps that they pay for. They also may not be willing to accept advertisements in free apps that are of low quality. Even though the app may be free, the user still must invest time and resources to download, install and use such apps.

Advertisers often give away useful physical items that are normally sold at a cost, such as pens and pocket knives, as promotional tools. They may modify the items to include advertising. A consumer may thereby obtain at no cost a functional item that the consumer recognizes has value. Consumers are generally much more likely to retain and use such items that they perceive have value than, for example, a marketing item containing advertising that is provided to consumers only as an advertising tool. The apps containing advertising disclosed in the prior art are analogous to such advertising tools.

SUMMARY OF THE INVENTION

The invention provides a system for distributing advertisements to modified applications running on target digital devices, the modified applications having been modified to accept advertisements from the system over a communications network, the system comprising:

a. a code validation module for receiving an authentication code over the communications network from a user of a target digital device, validating the code to determine that the user is entitled to download a modified application selected by the user, and authorizing the user to download the modified application and run the modified application on the target digital device; and b. an ad serving module for delivering advertisements to the modified application running on the target digital device over the communications network for display on the target digital device.

The target digital devices are mobile telephones.

The system may employ purpose-built hardware to perform the functions of the code validation module and ad serving module. Alternatively the system may include a programmable processor for executing software to perform the functions of the code validation module and ad serving module.

The system may further comprise an order management system for receiving requests from advertisers and providing authentication codes to the advertisers for distribution to users. The authentication codes may be provided on a physical token, which may be a card. Advertising images may be printed on the tokens. Alternatively the authentication codes may be delivered to the advertiser electronically via the communications network.

The advertisers may provide the advertisements to the system for storage in a database and retrieval by the ad serving module. The advertisers may further provide instructions that control the manner in which advertisements are rendered by the ad serving module.

Each modified application may be assigned a number of credits, and each authentication code may be associated with a number of credits, and validating the code may comprise checking that the number of credits associated with the code is at least as much as the number of credits assigned to the modified application selected by the user.

The system may further comprise a tracking module for receiving usage statistics from the modified application running on the target digital device about the user's use of the modified application.

The invention also provides for a method for distributing advertisements to users of target digital devices, the method comprising the steps of:

a. receiving an authentication code from a user of a target digital device over a communications network;

b. validating the code to determine that the user is entitled to download a modified application selected by the user;

c. authorizing the user to download the modified application; and d. delivering advertisements to the modified application running on the target digital device over a communications network, wherein the steps of the method are performed by a computer processor.

The computer processor may be a purpose-built hardware processor or may be a programmable processor that executes software that implements the steps.

The method may further comprise the step of receiving usage statistics from the modified application running on the target digital device about the user's use of the modified application.

The target digital device may be modified by storing the advertisements in a portion of memory in the target digital device associated with the modified application.

Modified applications selected by the user may be assigned a number of credits by the method, each authentication code is associated with a number of credits, and validating the code comprises checking that the number of credits associated with the code is at least as much as the number of credits assigned to the modified application selected by the user.

The invention also provides for a memory having recorded thereon instructions for execution by a computer processor to carry out the method.

BRIEF DESCRIPTION OF THE DRAWINGS

The present invention will now be described by way of example with reference to the following drawings in which.

DETAILED DESCRIPTION OF THE INVENTION

Figure 1:
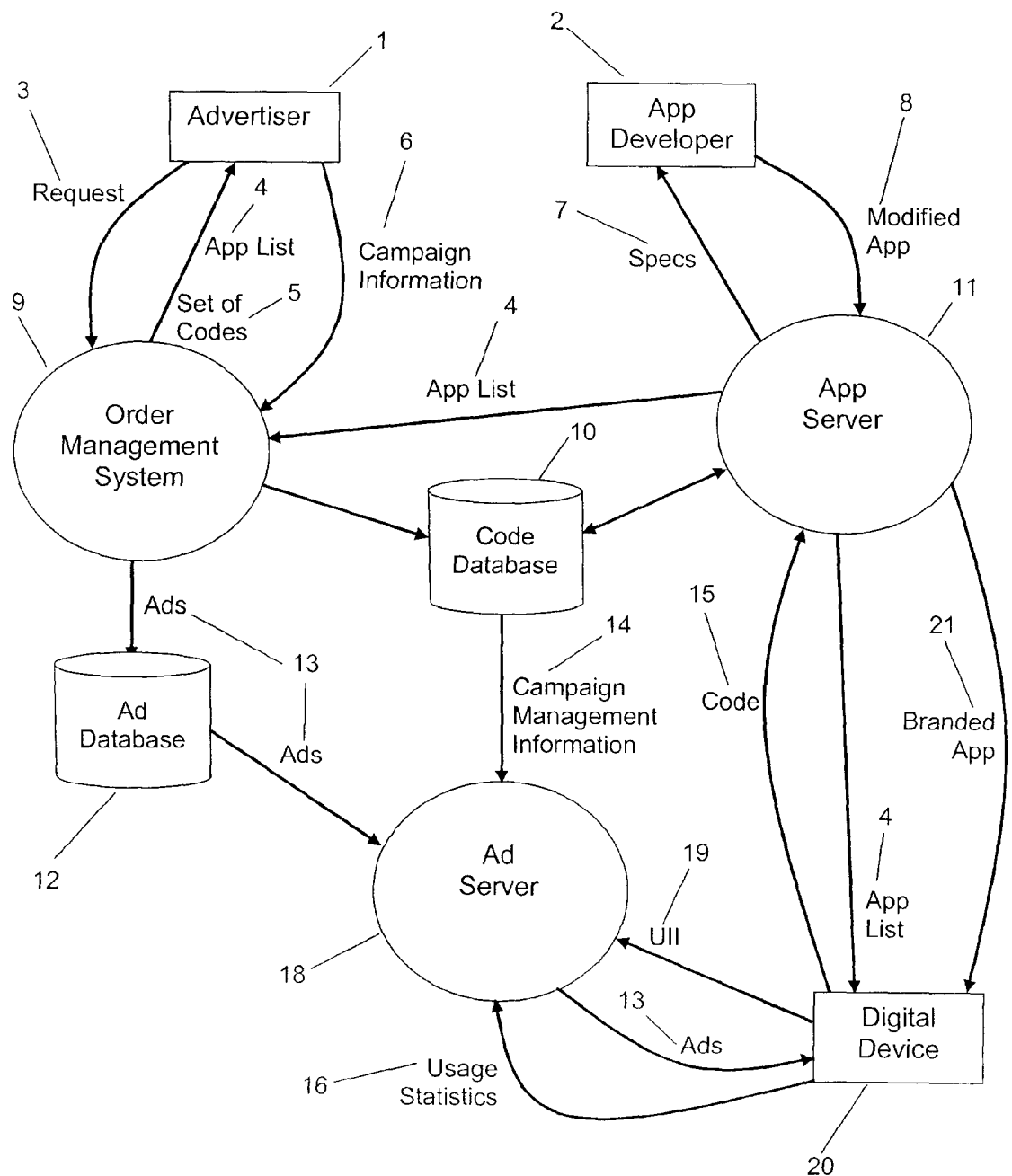
FIG. 1 is a diagram showing the major elements and data flows of one embodiment of the invention as a distributed system.

The invention provides methods and embodiments of those methods in computer-based systems to facilitate the serving of advertisements and messages, and, optionally, tracking of their presentation to users, on users' target digital devices, such as mobile phones. The invention will be described herein primarily with respect to embodiments that are computer-based systems interconnected with users' digital devices by a communication network, but it will be clear to those knowledgeable in the field that the invention includes the methods implemented in the described embodiments. In particular, the invention will be described in one embodiment as comprising an ad server that communicates with users' target digital devices as clients via a communication network. Such an ad server, or other computer-based subsystems described herein, may be a single computer system comprising a processor, network interface for accessing the communications network, storage means such as semiconductor memories and hard disk drives, and software running on the processor to cause it to perform the described functions. Such a subsystem may alternatively be a distributed system including multiple processors communicating via a communication network. Such a subsystem may alternatively be a purpose-built processor, or network of processors, comprising computer hardware designed to perform the functions described herein. Such purpose-built hardware may, for example, comprise custom designed computer chips (or application-specific integrated circuits) which may optionally include firmware for implementing certain functions, or may be implemented using a technology such as field programmable gate arrays or other types of programmable logic devices. In all cases, each embodiment of these subsystems is a particular machine that performs the described functions in the manner described herein as they would be understood by a skilled person. Furthermore, elements described as subsystems, or systems or modules, herein may be alternatively combined to share one or more processors. For example, all the described subsystems could be implemented on a single processor with sufficient storage and processing capacity.

It will be appreciated that the invention provides for a transformation of apps and target digital devices that is directly analogous to the transformation of other physical objects, such as pens and pocket knives, by the incorporation of advertising or messages thereon. Such a modified app is a sequence of bits comprising encoded instructions for processors that interpret the encoded instructions and thereby run the modified app. Such a modified app is stored in computer-readable memory, or storage means, such as: hard disk drives; semiconductor devices such as read-only memories, random access memories, flash memories and solid state drives, and optical storage means such as CDs and DVDs. The invention provides for the transformation of such physical devices (computer-readable memories) containing modified apps by the incorporation of advertisements or messages that are also stored in such computer-readable memories associated with the apps, such as a portion of memory associated with a modified app that is reserved for such advertisements or messages. The storage of this data in such memories physically transforms those memories so that a portion of them encodes the data in a form that can be retrieved. The invention thereby transforms the physical object which is computer-readable memory or memories containing the stored modified app. The invention further transforms the physical object that is the user's target digital device by causing it to display advertisements and messages inserted in the modified app by the invention in a manner analogous to placing an advertisement on the surface of a pen. A user's target digital device is transformed as a billboard is transformed by the placement of an advertisement thereon, although the target digital device may be further transformed by changing the advertising or message in the modified app much more rapidly than a billboard.

FIG. 1 shows the major elements and data flows of one embodiment of the invention having three major subsystems: an app server 11, ad server 18 and an order management system 9. It also has two databases shared between the subsystems: a code database 10 and an ad database 12. The app server 11 includes an app database that is managed by the app server 11. The app database could be distributed. For example, modified apps 8 provided by a particular app developer 2 could be hosted on a server controlled by that app developer 2.

Apps may be pre-existing apps that were developed by an app developer 2 or they may be new apps. In the former case, an app must be modified to enable it to receive and display data comprising advertisements and messages, which will be referred to herein as advertisements or "ads" 13, from the ad server 18, and optionally to provide usage statistics 16, to the ad server 18. In the latter case the modified app 8 must be designed to permit it to receive and display such ads 13 and optionally to provide usage statistics 16. In either case, apps capable of receiving and displaying such data from the ad server 18 and optionally providing usage statistics 16 to the ad server 18 will be referred to as "modified apps" 8. A modified app 8 may provide for displaying one or more ads 13 in a splash screen upon the user running the modified app 8, or at other suitable execution points, and also may provide for displaying ads 13 in a portion of the display screen while the modified app 8 is running on the user's target digital device 20. An app may run in a window on the display screen of the target digital device 20 or it may control the entire display screen when it is running. The latter will be assumed generally herein although it will be appreciated that the approach applies equally well to apps running in windows.

A branded app 21, which is a modified app 8 configured to display ads from a particular advertiser 1, will typically allocate a portion of the display screen (the "reserved portion") of the target digital device 20 for the display of ads 13 with the remainder of the screen being used for by the branded app 21 as it would do in the absence of the modifications. The reserved portion may be a fixed portion, such as a rectangular portion at the top of the display screen, or it may be variable. Other variants, such as a moving icon or a pop-up are also possible. In addition, the branded app 21 may also include an app load-up screen with advertiser 1 messaging. The load-up screen is the first screen that is displayed when a modified app 8 is launched. A branded app 21 may include default ads that are embedded in the branded app 21 before or during installation on the mobile device, that will display in the reserved portion of the app in the absence of a network connection to the ad server 18.

Figure 2:
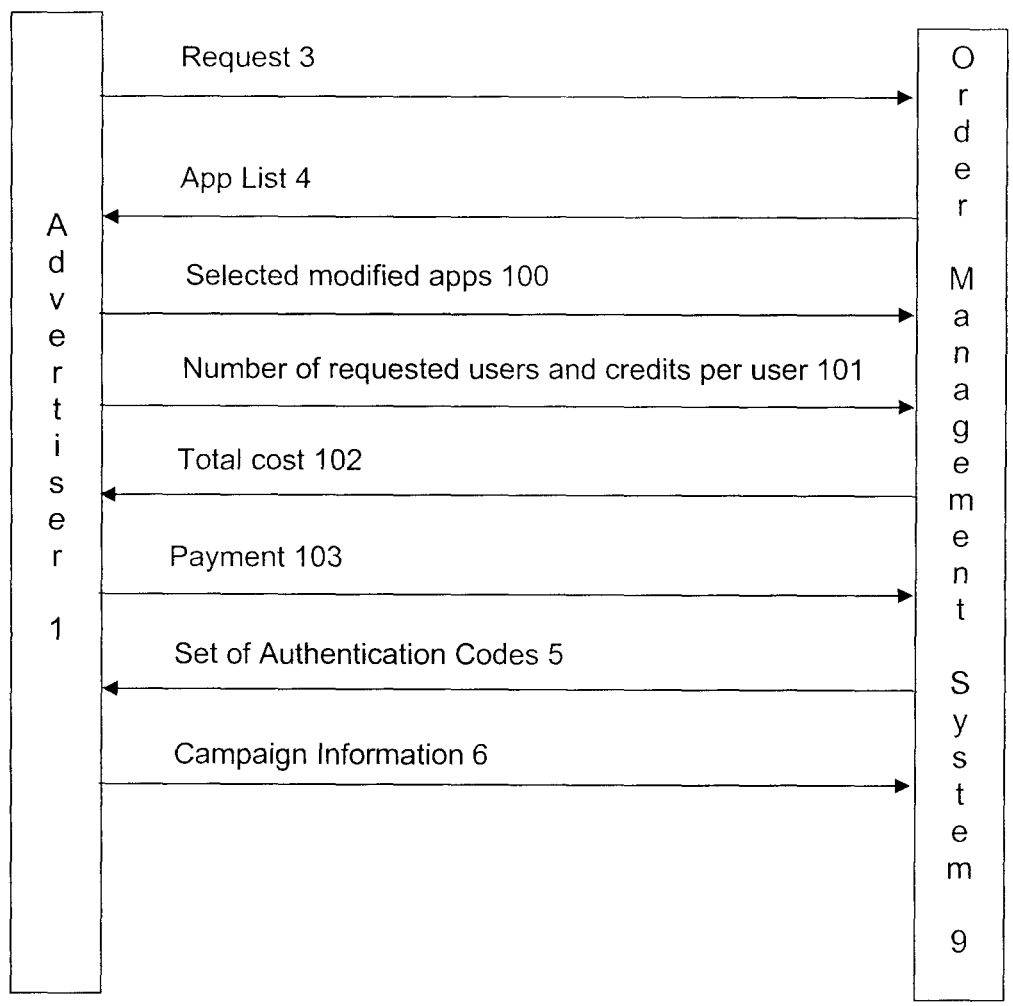
FIG. 2 is a diagram showing the sequence of certain messages exchanged between the advertiser and order management system.

An advertiser 1 who wishes to use the system for advertising may make a request 3 to the order management system 9. This process is further illustrated in FIG. 2. The request 3 may be made, for example, by the advertiser 1 using a web browser accessing a site managed by the order management system 9. The order management system 9 may retrieve an app list 4 from the app server 11 and display it to the advertiser 1, to allow the advertiser 1 to choose selected modified apps 100 that the advertiser 1 would like to use to display its advertisements. Each modified app 8 may be assigned a cost by the order management system 9, which is a number of credits, although dollar or other currency values could be equally well used and credits should be interpreted to include these. The cost of modified apps 8 may be displayed to the advertiser 1 as part of the app list 4. An advertiser can then purchase authentication codes 15 with sufficient credits to allow users (targets of the advertiser's advertising) to download apps using those credits. A user can then download, install and use one or more modified apps 8 as branded apps 21 that will display the advertiser's ads 13 on modified apps 8 when installed on the users' target digital devices 20.

The advertiser 1 can specify a number of requested users and credits per requested user 101. The advertiser 1 can create a set of conditions which users have to meet prior to using the assigned credits, for example users may have to provide their email addresses, answer survey questions, etc. before they can gain access to the credits. The same number of credits may be allocated to each user, or the advertiser may choose to allocate varying numbers of credits to users or classes of users. Based on the total number of credits requested, the order management system 9 may compute a total cost 102 that it displays to the advertiser 1 with a request for payment 103, which the advertiser 1 may make, for example, by the use of a credit card, cheque or other electronic payment means.

After payment, or after the terms of payment have been discussed and the order is confirmed, the order management system 9 generates a set of authentication codes 5 comprising one unique authentication code 15 for each requested user.

Authentication codes 15 are analogous to bank account numbers, and an account balance is maintained in a code database 10 for each authentication code 15. Each authentication code may consist of a number, a string of numbers and characters, or a combination of multiple strings and numbers. Each authentication code 15 is initially allocated the number of credits that were requested by the advertiser 1 for the associated user. The order management system 9 records the authentication codes 15 in the code database 10 along with the credit balance associated with each authentication code 15.

The set of authentication codes 5 may be provided directly to the advertiser 1 by the order management system 9, through various methods including email, text message, and coded methods such as barcodes that can later be scanned by the device. Alternatively, they may be provided as part of a physical token, such as, a set of cards, each including one or more than one authentication code 15, which may be produced and sent to the advertiser 1 for provision to users. Such cards may be customized according to an advertiser's requirements. For example, the advertiser may provide one or more images containing advertising, such as a company logo, that are placed on cards. Cards may be grouped and, for example, color coded according to the number of credits allocated to them, or coded in other ways such as identifying higher value cards with an identifier such as "VIP". Once a user has a card, the user can then use the authentication code 15 provided by the card to obtain one or more of the modified apps 8 that the advertiser 1 selected for its advertising campaign as branded apps 21, as described below. Cards and other physical tokens may use electronic, optical or magnetic storage of the authentication code instead of or in addition to printing the code on the tokens. For example a barcode may directly or indirectly encode the authentication code. Indirect encoding may be used, for example, to encode a user identification code that may then be associated with one or more authentication codes by the code validation module.

For each such campaign, the advertiser 1 may provide campaign information 6, which includes the ads 13 associated with the campaign, and campaign management information 14. The ads 13 may be stored in an ad database 12 where they are accessible by the ad server 18. The campaign management information 14 may be stored in the code database 10 so that a campaign is associated with each authentication code 15. The campaign management information 14 may include a campaign identifier and the order management system 9 may add links to the ads 13 in the ad database 12 to the campaign management information 14 that can be used by the ad server 18 to retrieve the ads 13. The campaign management information 14 may also include instructions on how to render the ads 13, how users meet advertisers pre-specified conditions, their location, their mobile carrier, frequency of use and/or timing of rotation of the ads 13. For example, the campaign management information 14 may contain a playlist specifying a sequence of ads 13 and a duration to display each one, or instructions to play certain ads until the user clicks on an ad, or it may push out a specific ad based on a user meeting a certain condition. There may also be a time limit after which apps cannot be downloaded when the campaign is complete. An advertiser 1 may be given the ability to later initiate a new campaign using previously distributed modified apps 8 from one or more prior campaigns, including placing new ads on modified apps 8, sending digital coupons for discounts, and targeting selected users for promotions.

The advertiser 1 is provided with specifications for ads 13 to be included in a campaign so that the ads 13 are compatible with the modified apps 8, and compatibility may be verified by the order management system 9 when they are provided by the advertiser 1. Ads 13 may comprise a sequence of one or more individual ads 13, where each individual ad 13 may be, for example, an image or a timed sequence of images, or streaming content showing, for example, news, sports scores/headlines, or stock quotes in addition to advertising content, such as a company logo. Ads 13 may be associated with hyperlinks so that a user will be directed to a particular website, for example, if the user clicks on the ad 13. Alternatively an ad 13 may be defined so that clicking on it causes a different image or video to appear, or causes the phone to dial a particular number.

Authentication codes 15 may be distributed by various means, such as within emails, text messages, barcodes that can later be scanned by the device, or on cards provided to users by advertisers 1, for example, at a trade show, similarly to handing out customized pens. A particular set of authentication codes 5 may be associated, for example, with one advertiser 1, or one campaign for multiple advertisers 1. Such a set may further be associated with a particular trade show, for example, so that, by tracking the usage of the codes, an advertiser could thereby assess the relative effectiveness of its attendance at various trade shows.

Ads 13 may also comprise messages, such as "Happy Birthday Joe!". An individual, acting as an advertiser 1, could purchase for example, a single authentication code 15 and associate that authentication code 15 with such a message for use in the load-up screen, visible upon running a modified app, and possibly other messages for display while the branded app 21 is running. This authentication code 15 may be provided directly to the individual electronically by the order management system 9 upon payment. Alternatively, the authentication code 15 may be provided to the individual in the form of a physical card. The individual could provide the card to someone as a gift, effectively making a gift of the modified app 8 as a branded app 21 incorporating the individual's message or a standard message offered by the order management system 9. In this case, the campaign management information 14 provided by the individual may specify that the display of the message may be disabled by the user, possibly retaining an initial load-up screen ad but disabling the in-app ad while the modified app 8 is operating so that the reserved portion of the screen is no longer used for the display of the message so that the branded app 21 can use the full screen as it would in its unmodified form. The individual or the user can select if they want the ad 13, in any form, to be displayed or not.

An app server 11 may provide access to a list of modified apps 8, referred to as an app list 4, to users via a communication network, such as the internet, and allow users to download branded apps 21 using their authentication codes 15. The app server 11 may be available via the internet by the user of a browser or other software on a user's target digital device 20 or other digital device 20, such as a personal computer that syncs with the target digital device.

Figure 3:
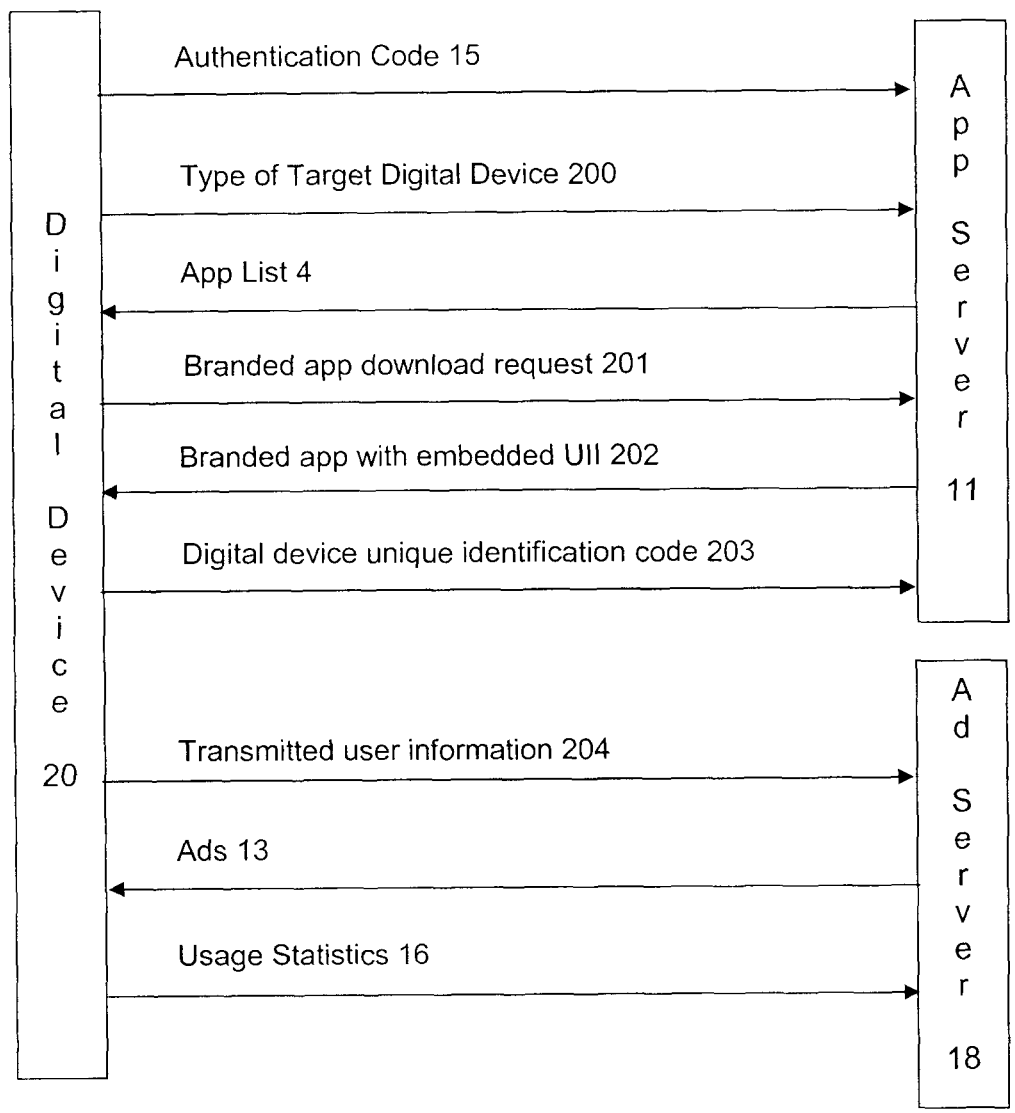
FIG. 3 is a diagram showing the sequence of certain messages exchanged between the digital device, the app server and the ad server.

Referring to FIG. 3, the app server 11 contains a code validation module which receives and validates an authentication code 15 from the user to determine that the authentication code 15 is valid and ascertain the available number of credits associated with the authentication code 15 from the code database 10. After validation, the app server 11 may transfer control to an app serving module which, for example, may take the user to a microsite specific to the campaign associated with the authentication code 15. The user may indicate to the app serving module the type of target digital device 200 that the user wishes to obtain branded apps 21 for, or the app serving module may auto-detect the target digital device's make, model, operating system and/or mobile carrier used by it.

The app serving module may then present an app list 4 to the user listing modified apps 8 associated with the campaign that are compatible with the user's target digital device 20. This may include the cost of each modified app 8 as a number of credits and also may show the total number of credits available to the user that are associated with the user's authentication code 15 in the code database 10. The user may then select a modified app 8 and make a branded app download request 201, which is analogous to offering to purchase a branded app 21. If the user has at least the number of credits in the account associated with the authentication code 15 that is the cost of the modified app 8, the code validation module authorizes the app serving module to transmit the selected modified app 8 as a branded app 21 to the user's digital device 20. After such authorization, the code validation module also decreases the number of credits in the account (the balance of the account) in the code database 10 associated with the authentication code 15 by the cost of the modified app 8. The app serving module then transmits the selected branded app 21 to the user's digital device 20.

The authorization module and app serving modules could be located on different physical servers and there could be multiple instances of app serving modules.

The app serving module embeds from the app server 11, a unique tracking code, an associated advertising campaign identifier and an app identifier (collectively referred to as "user identifying information" or UII 19), all of which are related to the authentication code 15, directly in the modified app 8. The tracking code, and optionally other UII, may be stored in the code database 10, in association with the user's authentication code 15. The app serving module may also embed a set of ads 13 in the modified apps 8 to be used by default if the target digital device 20 cannot access the communications network when it runs. This set of ads 13 may be specified as part of the campaign management information 14 provided by the advertiser 1. The modified app 8 after incorporation of such embedded information may be referred to as a branded app 21. The ad may be embedded in the modified app 8 before, during or after it is downloaded onto a digital device.

After a branded app 21 has been downloaded, the user may install it on the target digital device 20, which may require the branded app 21 to be transferred to the target digital device 20 from the digital device 20 that the user used to download the branded app 21 in the case these are different devices.

It is possible that a user could download multiple copies of the same modified app 8 as multiple branded apps 21, each associated with a different advertising campaign. In this case, the last download of the modified app 8 will overwrite all previous downloads of the same modified app 8.

The user may also be provided with other items to select for download, such as digital music compatible with the user's target digital device, which may have an associated credit cost. This may be appropriate, for example, for use by an individual who wishes to give the right to download some music to a friend as a present by giving a customized card or sending an email showing the authentication code 15 to the friend, or by an advertiser to users whose digital devices may not be compatible with the modified apps 8 provided for download.

After the user downloads the branded app with embedded UII 202, the app server 11 may also obtain a digital device unique identification code 203 for the user's target digital device 20, such as a PIN, that can be stored in the code database 10 and used to tie the authentication code 15, and branded app 21 that is downloaded by the user to that particular device.

When the user installs and runs a branded app 21 on the target digital device 20, the digital device 20 may transmit to an ad serving module running on the ad server 11 the tracking code embedded in the branded app 21 and other UII 19. This transmitted user information 204 allows the ad serving module to determine which ads 13 to push to the branded app 21. The ad server 18 may look up the tracking code in the code database 10 and determine what campaign it applies to by retrieving the campaign management information 14. It may then retrieve the ads 13 associated with that campaign from the ad database 12 and push the ads 13 to the branded app 21 as it runs on the user device 20 based on the rendering instructions contained in the campaign management information 14.

If the branded app 21 cannot access the communications network when it is first run, it may display default ads preloaded into the branded app 21 by the app serving module or loaded when the branded app is first launched. The branded app 21 may buffer one or more ads in the target digital device 20 memory and continue to display those ads 13 in the case that access to the communications network is lost while the branded app 21 is running on the target digital device 20.

When a campaign ends that is associated with a particular authentication code 15, which time may be specified in the campaign management information 14, and the ad server 11 receives a tracking code from a user's target digital device 20 that is associated with that authentication code 15, the ad server 18 will no longer transmit new ads to that target digital device 20. An advertiser 1 could prevent this from occurring by extending the duration of a campaign, or re-assigning authentication codes 15 to other on-going campaigns.

The branded app 21 running on the target digital device 20 may send usage statistics 16 to a tracking module in the ad server 18 while it is running. The usage statistics 16 may include the time that the application was started and the time it was terminated, and may include the duration that each ad 13 was displayed on the screen of the target digital device 20, for example. The usage statistics 16 may also include information on whether and how the user interacted with any interactive ads 13. The ad server 18 may store the collected usage statistics 16 in a usage database along with the associated UII 19 for further processing and reporting. The collected usage statistics 16 for a campaign may be transmitted to the advertiser 1, either in raw or processed form, which may be done periodically or at the planned end of a campaign. In all cases, privacy issues are addressed.

The apps developed by an app developer 2 may be commercial apps published and sold by the app developer 2. Such an app developer may be willing to allow its app to be used for advertising purposes in return for the payment of a fee, which may be a certain amount for each target digital device 20 on which the associated modified app 8 will be authorized to run. The app developer would be provided with specs 7 that may include specifications, instructions and code for modifying the app to accept ads 13 from the ad server 18 and, optionally, to send usage statistics 16 back to the ad server 18. The specs 7 may include other required functionality, such as the ability to receive other promotional messages and advertisements, or to enhance the functionality of the ad such as to load a video or call a specific number. The app developer 2 could then modify the app and provide the modified app 8 to the app server 11. The app server 11 may be used to validate the modified app 8 to ensure that the modifications have been made in conformance with the specs 7.

The app server 11 stores such modified apps 8 in an app database that it manages which includes information such as the types of target digital devices 20 (e.g. make and model number, operating system and mobile carrier) that each modified app 8 runs on. Each modified app 8 provided by an app developer 2 may in fact consist of a set of modified app variants, each being compatible with one or more target digital devices 20. In this case, the app server 11 would authorize the download by a user of the variant compatible with the user's target digital device 20.

It will be appreciated that the above description relates to the described embodiments by way of example only. Many variations on the system and method for delivering the invention without departing from the spirit of same will be clear to those knowledgeable in the field, and such variations are within the scope of the invention as described and claimed, whether or not expressly described.

What is claimed is:

1. A system for distributing advertisements to modified applications running on target digital devices, the modified applications having been modified to accept advertisers' advertisements from the system over a communication network, the system comprising:
   a. an order management system comprising a processor running software for receiving requests from advertisers and generating and providing authentication codes to the advertisers for distribution to users of the target digital devices;
   b. an app server comprising a processor running software having a code validation module for (i) receiving authentication codes over the communication network from the users of the target digital device, the authorization codes having been received by the users from the advertisers; (ii) validating the codes to determine that the users are entitled to download modified applications selected by the users, and (iii) authorizing the users to download the modified applications and run the modified applications on the target digital devices; and
   c. an ad server comprising a processor running software having an ad serving module for delivering the advertisements to the modified application running on the target digital devices over the communications network for display on the target digital devices, the advertisements being selected based on the user identifying information and authentication code embedded in the modified applications, wherein the advertisements are from the a campaign of the advertiser whom the authentication code is received from.

2. The system of claim 1 wherein the target devices are mobile telephones.

3. The system of claim 1 wherein the app server and ad server comprise the same processor.

4. The system of claim 1 wherein validating an authentication code comprises verifying that the authentication code is in a code database.

5. The system of claim 4 wherein authorizing a user to download a modified application comprises authorizing an app serving module in the app server to transmit the selected modified application to the user's target digital device.

6. The system of claim 4 wherein Each Modified Application is assigned a number of credits, each authentication code is associated with a number of credits, and validating the code further comprises checking that the number of credits associated with the code is at least as much as the number of credits assigned to the modified application selected by the user.

7. The system of claim 1 wherein the authentication codes are provided on physical tokens.

8. The system of claim 7 wherein the tokens are cards.

9. The system of claim 7 wherein advertising images are printed on the tokens.

10. The system of claim 1 wherein the authentication codes are delivered to the advertiser electronically via the communications network.

11. The system of claim 1 wherein the advertisers provide the advertisements to the system for storage in a database and retrieval by the ad serving module.

12. The system of claim 11 wherein the advertisers further provide instructions that control the manner in which advertisements are rendered by the ad serving module.

13. The system of claim 1 wherein each modified application is assigned a number of credits, each authentication code is associated with a number of credits, and validating the code comprises checking that the number of credits associated with the code is at least as much as the number of credits assigned to the modified application selected by the user.

14. The system of claim 1 further comprising a tracking module for receiving usage statistics from the modified application running on the target digital device about the user's use of the modified application.

15. A method of distributing an advertiser's advertisements to a user of a target digital device, using an order management system, an app server and an ad server, each comprising at least one computer processor and software, the method comprising the steps of:
   a. the order management system receiving a request from the advertiser and generating and providing an authentication code to the advertiser for distribution to the user of the target digital device;
   b. the app server receiving the authentication code form the user of the target digital device over a communications network, the authorization code having been received by the user from the advertiser;
   c. the app server validating the code to determine that the user is entitled to download a modified application selected by the user;
   d. the app server authorizing the user to download the modified application; and
   e. the ad server delivering the advertiser's advertisements to the modified application running on the target digital device over a communications network, the advertisements being selected based on user identifying information and authentication code embedded in the modified applications, wherein the advertisements are from the a campaign of the advertiser whom the authentication code is received from.

16. The method of claim 15 further comprising the step of receiving usage statistics from the modified application running on the target digital device about the user's use of the modified application.

17. The method of claim 15 wherein the target digital device is modified by storing the advertisements in the portion of memory in the target digital device associated with the modified application.

18. The method of claim 15 wherein modified applications are assigned a number of credits, each authentication code is associated with a number of credits, and validating the code comprises checking that the number of credits associated with the code is at least as much as the number of credits assigned to the modified application selected by the user.

19. The method of claim 15 wherein the authentication codes are provide on physical tokens.

20. The method of claim 19 wherein the tokens are cards.

21. The method of claim 19 wherein advertising images are printed on the tokens.

22. A non-transitory computer readable-medium having recorded thereon instructions for execution by a computer processor to carry out the method, the method comprising the steps of:
   a. the order management system receiving a request from the advertiser and generating and providing an authentication code to the advertiser for distribution to the user of the target digital device;
   b. the app server receiving the authentication code form the user of the target digital device over a communications network, the authorization code having been received by the user from the advertiser;
   c. the app server validating the code to determine that the user is entitled to download a modified application selected by the user;
   d. the app server authorizing the user to download the modified application; and
   e. the ad server delivering the advertiser's advertisements to the modified application running on the target digital device over a communications network, the advertisements being selected based on user identifying information and authentication code embedded in the modified applications, wherein the advertisements are from the a campaign of the advertiser whom the authentication code is received from.

\* \* \* \* \*

UNITED STATES PATENT AND TRADEMARK OFFICE
CERTIFICATE OF CORRECTION

PATENT NO. : 8,442,864 B2  
APPLICATION NO. : 13/322031  
DATED : May 14, 2013  
INVENTOR(S) : Chopra et al.

Page 1 of 1

It is certified that error appears in the above-identified patent and that said Letters Patent is hereby corrected as shown below:

In the Claims

Claim 1,
Column 10, line 48, the first "the" should be deleted.

Claim 15,
Column 12, line 1, the second "the" should be deleted.

Claim 22,
Column 12, line 45, the second "the" should be deleted.

Signed and Sealed this
Sixteenth Day of July, 2013

Teresa Stanek Rea
*Acting Director of the United States Patent and Trademark Office*